United States Patent [19]
Rossol et al.

[11] 4,105,925
[45] Aug. 8, 1978

[54] OPTICAL OBJECT LOCATOR
[75] Inventors: Lothar Rossol, Sterling Heights; Joseph T. Olsztyn, Madison Heights; Robert Dewar, Warren; Steven W. Holland, Utica, all of Mich.
[73] Assignee: General Motors Corporation, Detroit, Mich.
[21] Appl. No.: 777,011
[22] Filed: Mar. 14, 1977
[51] Int. Cl.² .......................................... G01N 21/30
[52] U.S. Cl. .................................. 250/561; 250/560; 356/167
[58] Field of Search ................. 250/560, 561; 356/156, 356/167

[56] References Cited
U.S. PATENT DOCUMENTS 3,727,067  4/1973  Shepherd .................... 356/167 X
3,890,509  6/1975  Maxey ............................ 250/561

Primary Examiner—Lawrence J. Dahl
Attorney, Agent, or Firm—Warren D. Hill

[57] ABSTRACT

In order to determine the position and orientation of an object on a conveyor, two planes of light intersect at a single transverse line on the conveyor surface, the planes of light each being at an acute angle to the conveyor. A linear diode array aligned with the single line of light on the conveyor detects light from that line. An object on the conveyor moving through the line of light intercepts the light above the conveyor at positions spaced laterally from the line of light. The linear array senses only the line segments on the conveyor beyond the object boundaries. By electronic sampling of the illumination of the linear array, the object boundaries are determined and the object shape and orientation are thus detected.

2 Claims, 3 Drawing Figures

OPTICAL OBJECT LOCATOR

This invention relates to an electro optical device for determining the position of an object on a conveyor.

It is desirable in manufacturing activities to handle, without human intervention, parts carried by conveyor systems which do not control part position on the conveyor. Such automatic handling, such as machine loading and assembly, can be carried out by a robot manipulator if the position of each part can be determined. It has been proposed to optically locate an object by backlighting the object or by placing it on a surface treated to produce special spectral effects to sharply silhouette the object to facilitate electro optical vision. These special background requirements drastically limit the number of practical applications.

It has also been proposed to project at one angle a sharp edge of light onto an object surface and to scan the scene with a two-dimensional detector arranged at a different angle to establish the object height and contour of surface features. That system requires complex detecting and information processing equipment and introduces inherent errors regarding the size and shape of the object due to shadows created by the object itself.

It is therefore an object of this invention to provide an optical locator device of general purpose application useful with conventional conveyor equipment.

It is a further object of the invention to provide an optical locating device which is independent of the apparent brightness, color or reflectivity of the conveyor or object surface.

The invention is carried out by providing light sources for projecting onto a conveyor surface two planes of light intersecting the surface at a single line, each plane of light being at an acute angle with the surface, and a linear light responsive detector arranged perpendicular to the surface and aligned with the line of light to detect the light on the surface. An object passing through the illuminated area displaces the line of light so that it is not visible to the photosensitive array in the region corresponding to the object. An electronic device samples the detector to determine what portions of the conveyor surface are illuminated by the line of light to thereby establish the boundaries of the object. The invention further contemplates a conveyor position detector signalling the electronic unit to enable object dimension information to be correlated with conveyor position.

The above and other advantages will be made more apparent from the following specification taken in conjunction with the accompanying drawings wherein like reference numerals refer to like parts and wherein.

Figure 1:
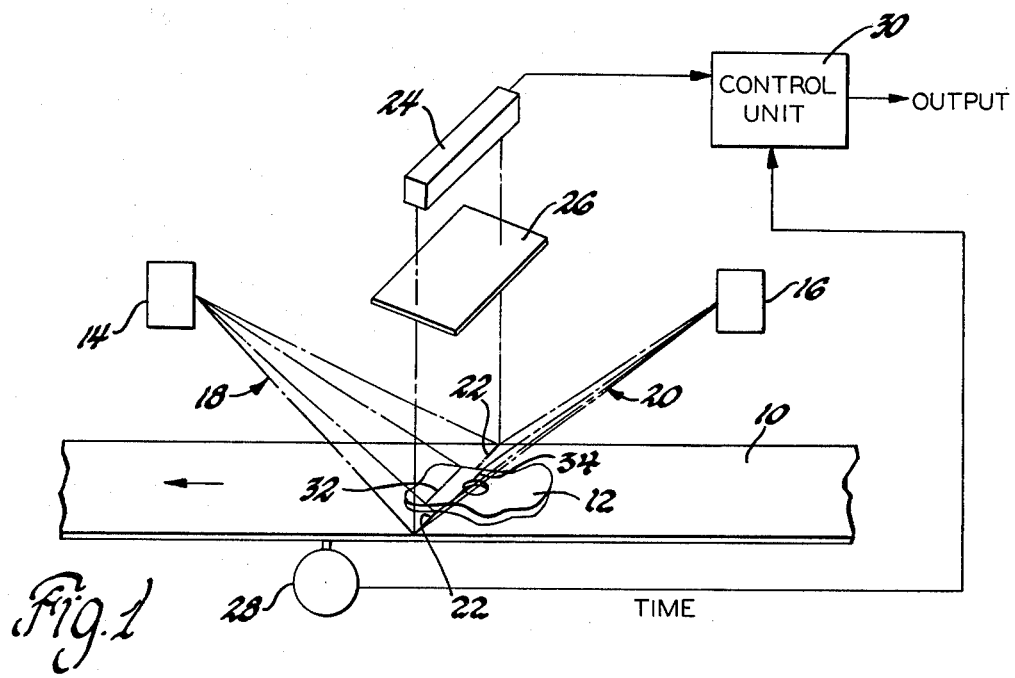
FIG. 1 is a diagrammatic perspective view of an optical locator device according to the invention as applied to a part moving on a conveyor belt.

Referring to FIG. 1, a conveyor belt 10 moving longitudinally carries an object 12 whose location is to be determined to facilitate control of parts handling equipment, such as a robot manipulator, not shown. A left light source 14 and a right light source 16 each emit light in sheet form in planes 18 and 20, respectively which intersect each other at a line 22 on the surface of the conveyor belt 10 and transverse to the belt. The light sources are on opposite sides of the line 22 and each plane of light 18 and 20 forms an acute angle with the conveyor surface. Thus the planes of light define a dihedral angle with its apex on the conveyor surface. Each light source must provide a clean plane of light which will project a narrow line of light across the belt. This requirement is achieved by diverging a low power helium neon laser beam by reflecting it from the surface of a cylindrical reflector. Alternatively, each light source comprises a xenon strobe lamp focused through a slit and a cylindrical lens to form a sheet of light.

A linear diode array 24 which is a type of one-dimensional solid state television camera comprising a linear series of photo elements is positioned above the conveyor belt and between the light sources 14 and 16 and is perpendicularly aligned with the line of light 22. The array 24 is narrowly focused onto the line 22 so as to be nonresponsive to light from sources laterally spaced from the line of light 22. Each photo element in the array is sensitive only to light from a very small segment from the line of light 22 such that the illumination of any given photo element in the array 24 is dependent upon the illumination of the corresponding segment of the light 22 on the conveyor surface. As is known, the linear diode array cameras such as the LC600 series sold by the Reticon Corporation are available in various resolutions typically containing, for example, 128 or 1,024 photo elements. The linear diode arrays are further available with electronic circuitry for sequentially scanning the array elements to provide either digital or analog video signals indicating the illumination level of each element as well as clocking and synchronizing pulses. A narrow bandpass optical filter 26 is optionally inserted in front of the linear array 24 to reflect light frequencies not close to the source frequencies thereby raising the signal to noise ratio.

A belt position encoder 28 such as an optical shaft position encoder Rotaswitch Model 702 is attached directly to the conveyor belt or geared to the conveyor drive mechanism. Each time the conveyor has moved a small increment of distance, say 3/16 inch, the encoder emits a square wave timing pulse so that each pulse relates to a specific belt position.

A control unit 30 preferably incorporating a programmed computer or a microprocessor is connected to the output of the linear diode array 24 and the output of the position encoder 28. The control unit provides the logic necessary to assimilate the data from the array 24 and calculate the desired information on the object under surveillance. Where the light sources include strobe lamps, the control unit also triggers the strobe lamps in response to the encoder timing pulse and synchronizes the strobe flash with the scanning of the diode array.

Figure 2:
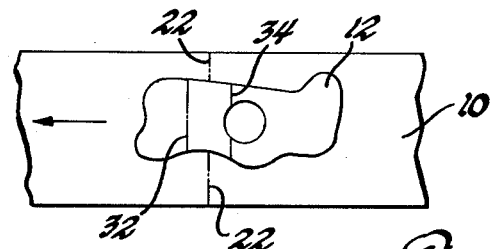
FIG. 2 is a plan view of the object and conveyor belt of FIG. 1.

In operation, with no object 12 present on the conveyor, the array 24 is fully illuminated since the line of light 22 will extend fully across the belt 10. When, however, an object 12 of significant thickness is carried by the conveyor across the line 22, the surface of the object 12 intercepts the planes of light 18 and 20 at positions above the conveyor belt to form lines 32 and 34 (as best seen in FIG. 2) each laterally spaced from the line 22 in the direction of the respective source by an amount proportional to the object thickness. Since the linear diode array 24 is narrowly focused to the region of the line 22, the displaced lines 32 and 34 will be outside the field of view and photo elements in the array corresponding to the object are not brightly illuminated whereas those elements corresponding to the line of light 22 which does reach the conveyor belt will be brightly illuminated. Thus when the photo elements are scanned, the difference between the bright and dark elements is readily detected and the width of the object at a given conveyor position is definitely established. As the part 12 progresses through the line 22, the array is repeatedly scanned so that the entire outline of the object is determined.

Figure 3:
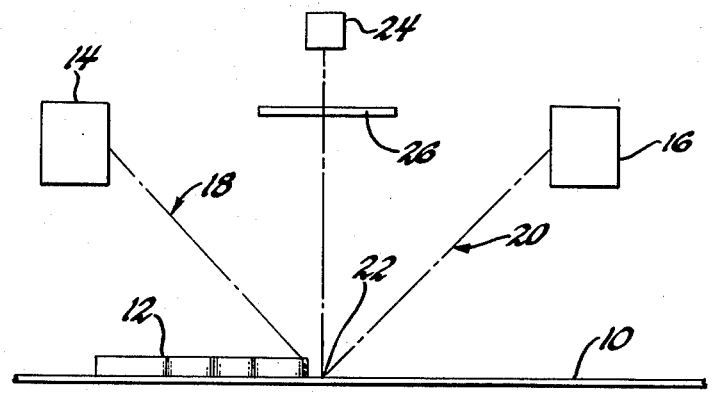
FIG. 3 is a diagrammatic elevation of the device according to the invention.

FIG. 3 illustrates the importance of using the two opposed light sources 14 and 16. If, for example, only one light source 14 were used, and the object 12 had just passed the field of view of the detector 24, the plane 18 of the line would still be intercepted by the object 12 thereby creating a shadow on the conveyor belt. Thus the array 24 would sense the shadow area and the information regarding the object shape would be distorted. According to the present invention, however, in which two light sources are used, the light from the source 16 as shown in FIG. 3 illuminates the surface 10 as soon as the object passes the line 22 thereby minimizing the problem of the shadows.

The locator device output consists of a list of geometric properties of the projection of each object passing through the field of view. These properties, presented sequentially in a digitally encoded format, form a menu of primitive measures which, in suitable combinations, can be used to determine the position and orientation of a large class of parts. The properties are defined independent of any particular object so as to be useful for a wide class of objects. Consider, for example, a long, straight section of pipe. Its projection onto the belt would be a long, thin rectangle. Knowing only (1) the center of area for that rectangle and (2) the angle of the principle axis, the position and orientation for the section of pipe is completely defined. This would provide adequate information to enable a mechanical manipulator to grasp the pipe from a moving belt. The following list provides a meaningful, but not exhaustive, set of properties which are readily extracted from the object projections.

1. Area
2. Average X-Coordinate
3. Average Y-Coordinate
4. Angle of Axis of Minimum Moment of Inertia
5. Perimeter
6. Number of Holes
7. Total Hole Area
8. Minimum Radial Distance From Center to External Boundry
9. Maximum Radial Distance From Center to External Boundry
10. Average Radial Distance From Center to External Boundry
11. Angle Corresponding to Measure 8
12. Angle Corresponding to Measure 9
13. Minimum X-Coordinate
14. Maximum X-Coordinate
15. Minimum Y-Coordinate
16. Maximum Y-Coordinate The calculations are performed by registering one scan line of the output of the linear diode array 24 for each timing pulse from the encoder 28 and then processing the data in accordance with well known techniques so that desired information about the scanned object is obtained. For example, to measure object area, the dark photo elements are counted for successive scan lines until a scan line occurs with no dark elements, indicating that the object has passed beyond the line of light 22. The sum of all the detected dark elements represents the area of the object and is readily coded into any desired form of output signal. Other information is also obtainable from the video output signals. For example, the relative positions of the dark to light element transitions establishes the location of the object boundary relative to the belt at a given scan line.

The primary function of the device is to determine the position and orientation of objects passing through its field of view. It should be apparent from the above list, however, that the device can be equally well used for many types of part inspection, identification and classification.

It will thus be seen that the apparatus according to this invention is effective to optically scan a moving conveyor and electrically determine the boundaries of objects carried by the conveyor, thereby gleaning sufficient information to accurately locate the position and orientation of each object.

The embodiments of the invention in which an exclusive property or privilege is claimed are defined as follows:

1. An electro optical locator device for determining the position of an object on a conveyor comprising
   first and second light sources fixed in space above the said conveyor and emitting light in sheet form in first and second planes defining a dihedral angle with its apex substantially on the conveyor transverse to the movement thereof and each plane being at an acute angle in relation to the conveyor for projecting onto the conveyor a single line of light transverse to the conveyor motion, wherein an object carried by the conveyor intercepts the light above the surface of the conveyor at positions laterally spaced from the apex of the dihedral angle so that the single line of light is projected onto the conveyor only outside the boundaries of the said object,
   a linear photosensor array of photo elements responsive to light in a plane perpendicular to the conveyor aligned with the apex of the dihedral angle for viewing the single line of light projected onto the conveyor outside an object boundary, the illumination of individual photo elements being dependent on the position of the boundaries of the object with respect to the conveyor and
   means responsive to the respective photosensor elements effective to determine the pattern of illumination of said photosensor array at a particular conveyor position to determine the position of the boundaries of the object relative to the conveyor.

2. An electro optical locator device for determining the position of an object on a conveyor comprising
   first and second light sources fixed in space above the said conveyor and emitting light in sheet form in first and second planes defining a dihedral angle with its apex substantially on the conveyor transverse to the movement thereof and each plane being at an acute angle in relation to the conveyor for projecting onto the conveyor a single line of light transverse to the conveyor motion, wherein an object carried by the conveyor intercepts the light above the surface of the conveyor at positions laterally spaced from the apex of the dihedral angle so that the single line of light is projected onto the conveyor only outside the boundaries of the said object, a linear photosensor array of photoelements responsive to light in a plane perpendicular to the conveyor aligned with the apex of the dihedral angle for viewing the single line of light projected onto the conveyor outside an object boundary, the illumination of individual photoelements being dependent on the position of the boundaries of the object with respect to the conveyor, conveyor position encoder means responsive to conveyor travel for providing a conveyor position signal, and electronic means responsive to the conveyor position signal and to the respective photosensor elements effective to determine the pattern of illumination of said photosensor array at a particular conveyor position to determine the position of the boundaries of the object relative to the conveyor.

* * * * *